AUTOMATIC TAPE SPEED CONTROLLING APPARATUS

Filed May 31, 1963 2 Sheets-Sheet 1

INVENTOR.
Isuke Sato
BY
Pierce, Scheffler & Parker
Attorneys

Feb. 16, 1965 ISUKE SATO 3,169,687

AUTOMATIC TAPE SPEED CONTROLLING APPARATUS

Filed May 31, 1963 2 Sheets-Sheet 2

INVENTOR.
Isuke Sato

BY

Pierce, Scheffler & Parker
Attorneys 3,169,687

AUTOMATIC TAPE SPEED CONTROLLING APPARATUS

Isuke Sato, Machida-shi, Tokyo, Japan, assignor to Nikken Sangyo Kabushiki Kaisha, Tokyo, Japan, a corporation of Japan Filed May 31, 1963, Ser. No. 284,474
Claims priority, application Japan, Aug. 10, 1962, 37/34,569
1 Claim. (Cl. 226—174)

This invention relates to an apparatus for driving a tape automotically at a constant speed in a tape recorder.

In driving a magnetic tape at a constant speed in a conventional tape recorder, there are used a method by a capstan and a method by a reel drive. Of them, in the method by the capstan, a heavy flywheel is fixed to the shaft of the capstan so that the rotating speed of the capstan driving the magnetic tape may be made constant by rotating the flywheel. However, such mechanism has defects that, depending on the precision of the manufacture of the flywheel, the rotation will be likely to become irregular and wows and flutters will be thereby caused, that, unless such intermediate transmitting mechanism members as gears and idlers are made very precisely, no accurate tape speed will be able to be obtained, that the tension of the tape will fluctuate so much at the beginning and end of winding the tape that a motor of a high output will be required and that the speed of the tape can not be properly adjusted over a wide range. According to the method by the reel drive, it is necessary to vary the number of revolutions of the motor to be several times as high in response to the variation of the outer diameter of the tape wound up on the reel and the force required to drive the tape fluctuates so widely in response to the diameter of the wound tape that a motor stable in a wide range of numbers of revolutions is required. But, in fact, a motor having such characteristic as is mentioned above can be hardly obtained. Therefore, it has defects that the running speed of the tape will inevitably fluctuate so much that flutters will be naturally likely to be thereby caused, and further that, the larger the diameter of the wound tape, the harder the motor will be to start and thus wows and flutters will be likely to be caused.

The present invention has been suggested to eliminate the above mentioned defects.

A principal object of the present invention is to provide an automatic tape speed controlling apparatus for tape recorders wherein the tape speed can be automatically controlled to be always constant and can be properly selected over a wide range.

Another object of the present invention is to provide an automatic tape speed controlling apparatus for tape recorders wherein the irregular rotation of a capstan can be prevented and wows and flutters can be minimized.

Embodiments of the present invention shall be explained with reference to the accompanying drawings in which.

Figure 1:
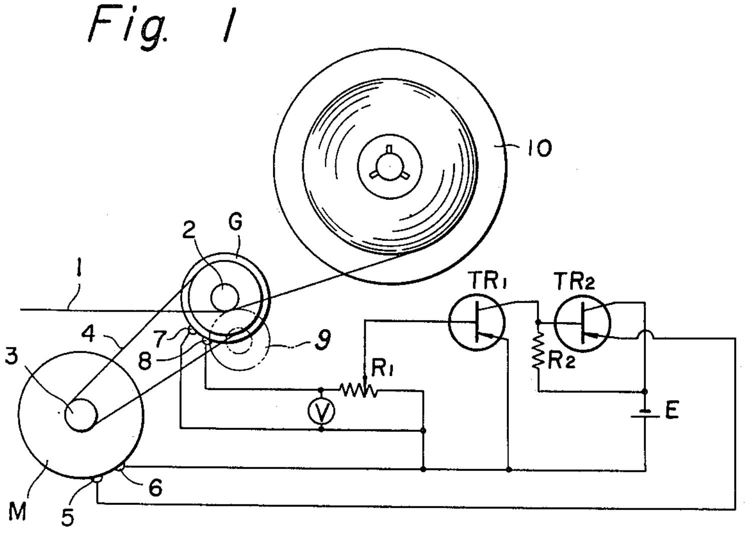
FIGURE 1 is a system diagram showing an embodiment of the present invention.

In the drawing, 1 is a tape and 2 is a capstan for driving said tape at a constant speed. The tape 1 is to be wound up on a reel 10 through said capstan. 9 is a pinch roller operating to press the tape 1 against the capstan 2. M is a micro-motor. 3 is a pulley directly connected to the shaft of the motor. 4 is a belt to operatively connect the pulley and capstan 2. G is a generator driven directly or indirectly by the rotation of the capstan 2. 5 and 6 are terminals of the motor M and 7 and 8 are output terminals of the generator G so that the output voltage of the generator G rotating in response to the rotation of the capstan may be led out through the terminals 7 and 8 and the driving current applied to the motor M may be regulated by said output voltage of the generator.

Figure 2:
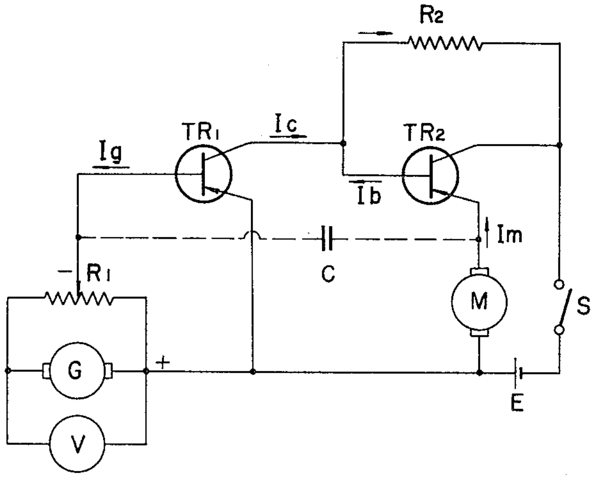
FIGURE 2 is a diagram showing an example of a controlling circuit.

The controlling circuit shall be explained with reference to FIGURE 2. In FIGURE 2, G is a generator, V is a voltmeter for measuring the terminal voltage of the generator, M is a motor, $TR_1$ and $TR_2$ are PNP type transistors, $R_1$ is a variable resistance, $R_2$ is a resistance. S is a switch, E is an electric current source and C is a smoothing condenser which can be omitted.

One terminal of the motor M is connected to the emitter of the second transistor $TR_2$ and the other terminal of the motor is connected to the plus side of the battery E. The collector of the second transistor $TR_2$ is connected to the minus side of the battery E through the switch S. The resistance $R_2$ is connected between the base and emitter of the second transistor $TR_2$. The collector of the first transistor $TR_1$ is connected to the base of the second transistor $TR_2$. The emitter of the first transistor $TR_1$ is connected to the plus side of the battery. The base of the first transistor $TR_1$ is connected to the slider of the variable resistance $R_1$. The generator G, voltmeter V and variable resistance $R_1$ are connected in parallel with one another. One terminal of the generator is connected to the plus side of the battery E.

The operation of the present invention shall now be explained. An electric current $I_M$ to drive the motor M flows from the plus side to the minus side of the battery E through the motor M, the collector and emitter of the second transistor $TR_2$ and the switch S. An electric current $I_b$ from the base of the second transistor $TR_2$ separately flows to the minus side of the battery E through the resistance $R_2$ and switch S. Further, an electric current $I_g$ by the output voltage of the generator G rotated by the rotation of the capstan 2 flows between the base and emitter of the first transistor $TR_1$. A collector current $I_c$ of the first transistor $TR_1$ flows from the plus side of the battery E through the emitter, collector, resistance $R_2$ and switch S.

Now, if, by any cause, the number of revolutions of the capstan 2 increases and the output voltage of the generator rises accordingly, the base current $I_g$ of the first transistor $TR_1$ will increase, the collector current $I_c$ of the first transistor $TR_1$ will increase accordingly, the voltage drop in the fixed resistance $R_2$ will increase, therefore the terminal voltage of the motor M will reduce, the number of revolutions of the motor will be reduced and the number of revolutions of the capstan will be decreased.

On the contrary, when the number of revolutions of the capstan 2 decreases, the output voltage of the generator G will reduce accordingly, the collector current of the first transistor $TR_1$ will decrease, as a result, the voltage drop in the fixed resistance $R_2$ will decrease, the terminal voltage of the motor M will increase, the number of revolutions of the motor will be increased and therefore the number of revolutions of the capstan will be increased.

If the value of the variable resistance $R_1$ is regulated, it will be possible to properly increase and decrease the value of the current $I_g$, therefore the number of revolutions of the motor M will be able to be varied over a wide range and, as a result, the running speed of the tape will be able to be automatically regulated over a wide range.

Though the transistors of the PNP type are shown in FIGURES 1 and 2, those of the NPN type can be also used. Further, though the generator G and capstan 2 are shown as coaxial with each other, it is needless to say that the generator G can be indirectly driven through an idler from the capstan.

Figure 3:
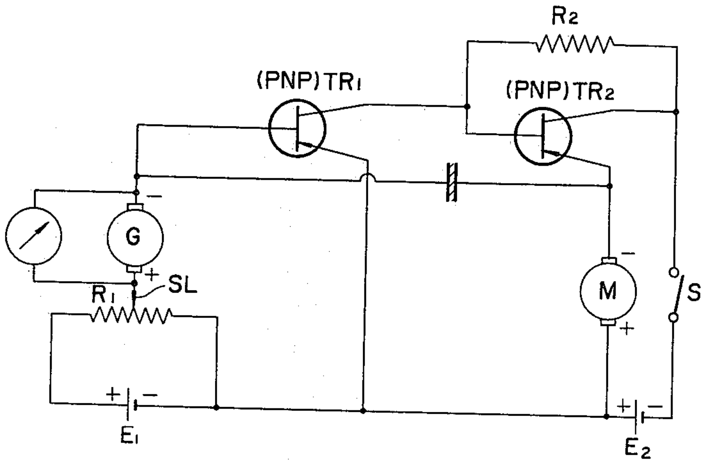
FIGURES 3 and 4 show other embodiments of the present invention.
Figure 4:
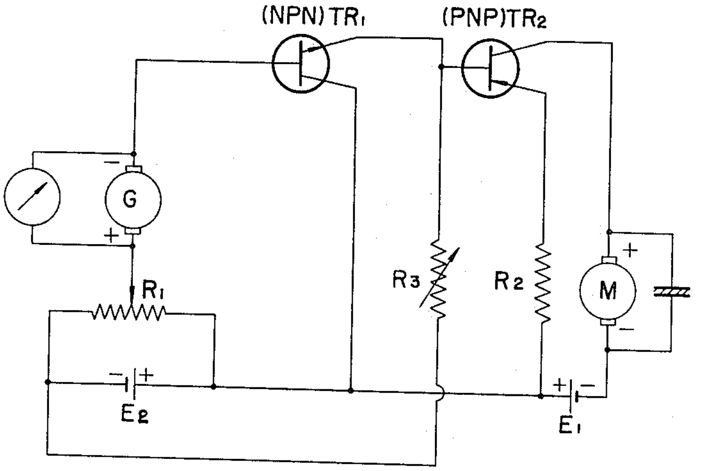

FIGURES 3 and 4 show other embodiments of the present invention. In comparing the circuit in FIGURE 3 and the circuit in FIGURE 4 with each other, it is found that only the generator circuit inserted between the emitter and base of the first transistor $TR_1$ is different but the other parts are the same in them. Specifically, in FIGURE 3, a potentiometer is connected to both terminals of the battery $E_1$ and the generator G is connected between the slider SL of said potentiometer and the base of the first transistor so that the difference voltage between the output voltage of said generator and the voltage applied by the potentiometer may be applied between the emitter and base of the first transistor $TR_1$. Therefore, the motor M can be controlled with the output voltage of the generator more sensitively than in the circuit in FIGURE 2.

In FIGURE 4, the first transistor $TR_1$ is of the NPN type, the generator G and the resistance $R_1$ for the potentiometer are connected as shown in FIGURE 3 between the base and collector of said first transistor $TR_1$, the collector is connected to the plus side of the battery $E_2$, the emitter is connected to the battery $E_2$ through a bias resistance $R_3$, the second transistor $TR_2$ is of the PNP type, the base of the second transistor and the emitter of the first transistor are connected with each other, the emitter of the second transistor is connected to the plus side of the battery $E_1$ through the resistance $R_2$ and the collector is connected to the minus side of the battery $E_1$ through the motor M so that the bias of the second transistor $TR_2$ may be obtained by the battery $E_2$ and may be independent of the battery $E_2$, the battery $E_1$ may operate only as an electric current source for the motor M and the influence of the fluctuation of the voltage of the battery $E_1$ on the motor may be reduced.

According to the present invention, as the generator G is rotated as operatively connected with the capstan 2 and the voltage of the motor M driving the capstan 2 is controlled in response to the output voltage of the generator, wows caused by the tape 1 and the winding mechanism for the tape or by the frictional parts before the capstan and flutters caused by the motor M will appear as irregular rotations of the capstan. Therefore, as the motor is controlled by detecting such irregular rotations of the capstan, all wows and flutters can be prevented.

Further, according to the present invention, as it is not necessary to use such flywheel as in the conventional capstan system, no irregular rotation will be caused by such flywheel. The mechanism is so simple that the motor may be small. By regulating the variable resistance $R_1$ without needing a governor for the motor, the tape speed can be automatically adjusted steplessly over a range of about 0.3 to 38 cm./sec.

What is claimed is:

An automatic tape speed controlling device in a tape recorder comprising a capstan to move a magnetic tape, a pinch roller in contact with said capstan, an electric motor to drive said capstan, a generator rotated by the rotation of said capstan, a first transistor to which a part of the output voltage of the generator rotated by the rotation of the capstan is to be added between its base and emitter, a second transistor having a base connected to the collector of said first transistor and a resistance connected between the base and collector of said second transistor, said electric motor to drive the capstan being set between the emitter and collector of said second transistor.

References Cited by the Examiner

UNITED STATES PATENTS

| | | | |
|---|---|---|---|
| 2,777,964 | 1/57 | DiMino | 226—42 X |
| 2,975,349 | 3/61 | Green | 318—345 X |
| 3,024,401 | 3/62 | Dinger | 318—327 |
| 3,097,332 | 7/63 | Mullin | 318—314 |

ROBERT B. REEVES, *Acting Primary Examiner.*

RAPHAEL M. LUPO, *Examiner.*